March 2, 1926. 1,575,472
R. A. L. WEITZEL
MOLDED PRODUCT AND PROCESS FOR ITS MANUFACTURE
Filed Sept. 26, 1924
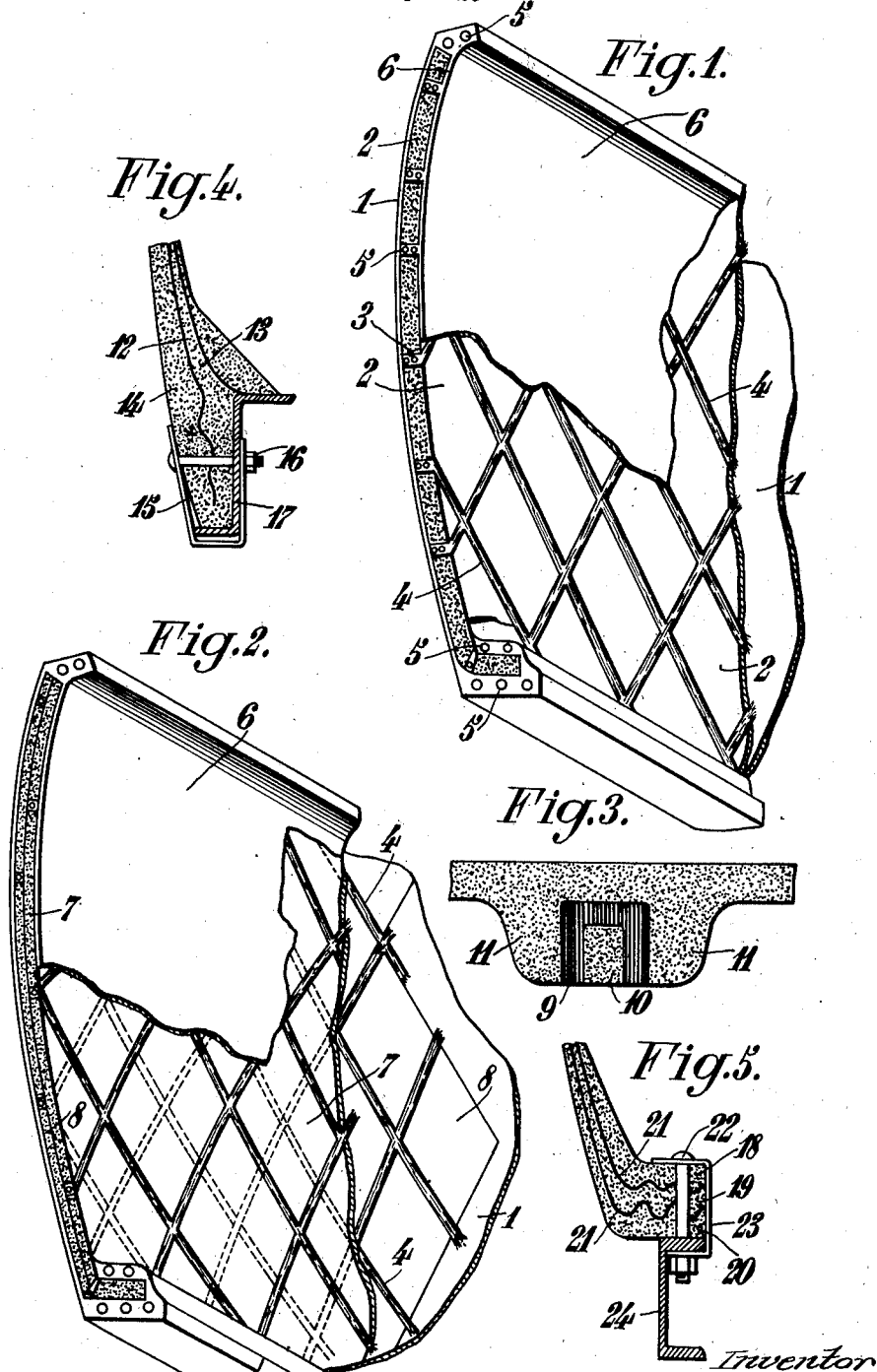

Patented Mar. 2, 1926.                                                    1,575,472

UNITED STATES PATENT OFFICE.

ROBERT AUGUSTE LOUIS WEITZEL, OF PARIS, FRANCE.

MOLDED PRODUCT AND PROCESS FOR ITS MANUFACTURE.

Application filed September 26, 1924. Serial No. 740,149.

*To all whom it may concern:*

Be it known that I, ROBERT AUGUSTE LOUIS WEITZEL, a citizen of the Swiss Republic, residing at 4 Square Desnouettes, Paris, Seine, France, have invented new and useful Improvements in Molded Products and Processes for Their Manufacture, of which the following is a specification.

The present invention relates to a molded product and to a process for its manufacture.

Molded products have already been proposed for use, for example, for the body-work of automobiles, which products comprise frame-members of wood or iron, connected together by metallic or vegetable trellis-work upon which there is applied a plastic paste capable of hardening. These products are subject to the drawback that the connection between the frame-work and the coatings constitutes a weak point in the body, and cracks owing to the shocks arising from abrupt stoppages, expansion of the materials and other causes.

The present invention has for its object to obviate this drawback by doing away with all frame-members. With this end in view, the molded article according to the invention comprises, starting with the outside and going inwardly: a layer of fibres, either free or woven, said fibres being agglomerated by a suitable binding medium capable of hardening; a layer of cork, either natural or agglomerated, this layer being constituted by juxtaposed plates, and finally a layer of fibres similar to the first.

In certain cases, where greater strength is required of the product, a small interstice is left between the joints of the plates of cork, and this is filled with long fibres agglomerated by a suitable binding medium.

According to another modification, two or more layers of cork plates could be provided, the joints of which are staggered from one layer to another.

According to yet another modification, the long fibres filling the joints may contain reinforcing stays.

The binding medium is given any desired colour and is rubbed with pumice stone after drying, so as to replace painting of the product.

In order to increase the rigidity or the strength at the places where the product, when in service, is subjected to stresses, it is provided with reinforcing ribs constituted by a frame of long fibres, agglomerated by means of a suitable binding medium, and arranged, eventually, around a core of cork or again in a recess formed in thickening pieces of cork.

The process for the manufacture of the product according to the invention consists in forming a mold having the shape of the object to be obtained, in lining this mold with a layer of fibres, either loose or woven, agglomerated by or coated with a suitable binding medium capable of hardening, in placing upon this layer, a layer of juxtaposed plates of cork and in applying to this layer of plates of cork a layer of fibres similar to the first.

According to a modification of this process, a small interstice is left between the plates of cork and is filled in with long fibres agglomerated by a suitable binding medium. Finally, there is applied to the joints likely to be highly stressed, a reinforcement composed of long fibres, agglomerated by means of a suitable binding medium.

The reinforcing frames may be lodged in recesses, formed by plates of cork which are attached during manufacture. These reinforcing frames may also be arranged around a core of cork with which they form one piece. When these frames are arranged in recesses, the core is forced into the fibres and presses these latter against the walls of the recess.

The invention is shown diagrammatically and by way of example in the accompanying drawing in which:

Fig. 1 is a perspective view of a fragment of a molded-product made with a single layer of cork.

Fig. 2 is a similar view of another form of execution with two superposed layers of cork, with staggered interstices.

Fig. 3 is a section of a reinforcing rib.

Fig. 4 shows the method of fixing an automobile body, constructed according to the invention, upon the longitudinal bearers of the chassis.

Fig. 5 shows a modification similar to the arrangement shown in Fig. 4.

A molded product according to the invention comprises, starting from the outside: a layer of loose or woven fibre 1, agglomerated by a suitable binding medium capable of hardening; a layer of cork, either natural or agglomerated, this layer consisting of juxtaposed plates 2 and, finally, a layer of fibres 6 similar to the first.

In certain cases where greater strength is required in the product, a small interstice is left between the joints 3 of the plates 2 and these interstices are packed with long fibres 4 agglomerated by a suitable binding medium.

According to another modification, two or more layers of cork 7, 8, Fig. 2, can be provided, the joints of which are staggered from one layer to the other.

If desired, the long fibres 4 filling the joints 3 may enclose reinforcing frames such as 5, these frames may be either metallic, vegetable or of any other kind, and may consist, for example, of steel cables, tubes, cords, pieces of bamboo or rings of cane and the like, according to the degree of strength which it is desired to obtain.

The binding medium can be given the desired colour so as to obviate the necessity for painting. In this case it is sufficient to rub the facings with pumice stone in order to obtain the desired aspect.

In order to increase the rigidity or the strength at places where the molded product is subject, when in service, to stresses it is provided with reinforcing ribs constituted by a frame 9, Fig. 3, having long fibres and agglomerated by means of a suitable binding medium; these long fibres 9 can eventually be arranged around a core 10 made of cork. Moreover, if desired the frame 9 can be arranged in a recess formed in thickening pieces 11 attached to the layers of cork.

The molded product may comprise on one or the other of its faces or upon both, a substance forming an ornamentation and having the desired appearance according to the application to which the product is intended. For example in the manufacture of bodies of automobiles the covering could be of leather, imitation leather, cloth or the like. In the manufacture of molded products intended for the manufacture of furniture, the substance forming the ornamentation might be veneered or otherwise covered.

The process of manufacture of the molded product according to the invention consists in forming a mold having the form of the object to be obtained, in lining this mold with a layer of loose or woven fibres 1 agglomerated by or coated with a suitable binding medium capable of hardening. In general, this layer is given a thickness of about 1 mm.; the binding medium is composed, for example, of a mixture of cement and of asbestos in the proportion of three of cement and one of asbestos. Upon the layer of fibre 1 there are arranged plates 2 made of natural or agglomerated cork having for example the form of lozenges having from 15 to 20 mm. thickness and 12 to 15 cm. side. These portions of cork are shaped to suit the form which it is desired to give to the molded product. One can juxtapose exactly the plates of cork and then apply another layer of fibres similar to the first. In this case the drying is carried out, the mold is emptied and the molded product is obtained having the desired shape.

In cases where greater strength is necessary, an interstice 3 of a few mms. is left around each piece of cork. When all these pieces of cork have adhered satisfactorily to the layer 1, the interstices 3 are filled with long fibres 4 agglomerated by means of a suitable binding medium and, for example, by means of the binding medium referred to above. One could also introduce into these interstices, and especially into the parts which it is desired to reinforce, metallic or vegetable stays 5 for example, steel cables, tubes, cords, pieces of bamboo or cane rings and the like according to the degree of strength which it is desired to obtain. This strengthening member is sunk in the fibres. The article thus prepared is covered with a second layer of fibres 6 similar to the layer 1. The layers of fibres 1 and 6 can be woven and if necessary may be given a coat of paint.

The binding medium itself can be coloured so as to have the desired shade, thereby doing away with the necessity of painting. In this case it is sufficient to rub the facings with pumice stone in order to obtain the desired appearance.

This process enables one to obtain molded products of extremely variable forms, which are applicable to all kinds of industries and have remarkable qualities as regards suppleness, lightness and strength. The portions likely to be subjected to a heavy stress can be reinforced, as will be seen below relative to the other parts which are not subjected to such great strains.

It would also be possible to place upon the exterior of the product two layers, such as 1 which are arranged in the mold and which are intended to increase the external resistance of the wall. It would also be possible to only provide a single layer 1 and to add thereto a metallic trellis-work serving to reinforce the wall.

The layers of fibres such as 1 or 6 can be replaced by a fabric or trellis-work of any suitable material impregnated with the binding medium referred to above.

The pieces of cork 2 can be of any suitable form, such as polygonal, having straight or curved sides or any combination of the two.

In the form of execution shown in Fig. 2, the pieces of cork 7, 8, instead of having a thickness of 15 to 20 mms. only have the half of this thickness, so that the thickness of the molded product is constituted by two superposed layers of pieces of cork 7 and 8, the joints of which are staggered from one layer to another. The molded product according to the invention is incombustible and exempt from any possibility of breakage by slitting or cracking, owing to the suppression of any joint between the frame-member and the coating material, since every frame-member is done away with owing to the present invention.

With a view to increasing the strength, it has been seen above that the molded product could comprise stays consisting of long fibres 9 agglomerated by the aid of a suitable binding medium. These stays can be applied directly to the molded product, or again, can be inserted in the recess formed in thickened portion made of cork, such as 11. The stay 9 made of agglomerated long fibres may comprise a cork core 10 which is driven into the fibres as soon as these latter are in place in the recess, thereby obtaining the advantage that the fibres of the stay 9 are compressed against the walls of the recess.

In cases where the molded product is applied to the manufacture of the bodies of automobile, it is possible to obtain motor car bodies in one piece, that is to say, forming a whole made at one operation, which can be fixed in any suitable manner upon the longitudinal bearer of the chassis.

At the same time it is preferable to provide a method of attachments similar to that shown in Figs. 4 and 5. In Fig. 4 the long fibres 12 which are lodged in the interstices of the cork plates 13, 14, are given an undulated form in the direction of the tractive efforts likely to be exerted upon the body of the car, relative to the point of attachment. With this end in view, the plates 13, 14 are themselves undulated and pressed against each other by a yoke 15 through which there passes a bolt 16 fitted in the bearer 17. As can be seen, the yoke 15 presses the two plates 13 and 14 against the bearer 17 and these two plates clamp between them the long agglomerated fibres 12 which furnish the resistance to traction.

In the case of Fig. 5 which is only a modification of Fig. 4, but adapted to the case where the body of the car is fixed upon the upper flange of a bearer having the shape of a U on its side, the cork plates 18, 19, 20, have undulated surfaces which fit, one within the other, and clamp the long fibres 21 between them. The plates 18, 19 and 20 are forced by the bolt 22 and a yoke 23 against the upper flange of the bearer 24.

The present invention is applicable to any industry and in particular to the manufacture of body-work for terrestrial vehicles or apparatus for marine or aerial navigation, to the manufacture of furniture, buildings (walls, doors, windows, cabins) and it will be understood that the enumeration just given above is only indicative and not limitative.

The different layers and materials hereinbefore specified as embodied in the improved process and product are caused to adhere through the medium of the binding material, which serves to agglomerate the different layers and materials. The cork plates or members are applied to the remaining parts or materials when the binding medium is still wet, so that all the constituents of the product are finally cemented together after the binding medium has become set or hardened. It will be noted in the present invention that no compression or heat is necessary for molding the product.

I claim:

1. A molded product of the class specified, comprising an outer fibrous layer, a layer of cork material, and a layer of fibrous material similar to the first layer, all of these components being agglomerated by a binding medium applied to the outer layer of fibrous material and securing the remaining layers to the outer layer when hardened.

2. A molded product of the class specified, comprising an outer layer of fibrous material, a binding medium applied to said outer layer, a second layer composed of a plurality of juxtaposed cork plates having interstices between them, and long fibers inserted in the interstices between said plates, the second layer and long fibers being secured to the outer layer of fibrous material by the binding medium applied to said outer layer.

3. A molded product of the class specified, comprising an outer layer of fibrous material agglomerated by a binding medium, a plurality of juxtaposed cork plates having interstices between them, the joints of the plates being staggered with relation to one another, and long fibers inserted in the interstices between said plates, the cork plates and long fibers being secured to the fibrous material by the binding medium applied to the latter material.

4. A molded product of the class specified, comprising an outer layer of fibrous material agglomerated by a binding medium capable of hardening, a plurality of juxtaposed cork plates having interstices between them, and long fibers inserted in the interstices between said plates and having reinforcing members, the cork plates and long fibers being held secured to the fibrous material by the binding medium applied to the latter.

5. A molded product of the class specified, comprising an outer layer of fibrous material agglomerated by a colored binding medium capable of hardening, the binding medium being rubbed with pumice stone to smooth the same and avoid the necessity of painting the product, a plurality of juxtaposed cork plates having interstices between them, and long fibers inserted in the interstices between said plates, the cork plates and fibers being secured to the outer layer of fibrous material by the binding medium applied to the latter.

6. A molded product of the class specified, comprising an outer layer of fibrous material having a binding medium applied thereto, an outer layer of fibrous material having a binding medium applied thereto, cork material secured to said layer, and reinforcing ribs consisting of a stay of long fibers and associated with and secured to the cork material.

7. A process for the manufacture of a molded product of the class specified, consisting in placing within a mold a layer fo fibrous material and applying thereto a binding medium capable of hardening, arranging a layer of cork material on the fibrous material, and then applying a further layer of fibrous material on the cork material, all of the layers being secured by the binding medium applied to the first layer.

8. A process for the manufacture of a molded product of the class specified, consisting in placing within a mold a layer of fibrous material and applying to the latter a binding medium capable of hardening, arranging layers of cork on the fibrous material and leaving interstices between said plates, and filling the interstices between the plates of cork with long fibers, the plates of cork and fibers being secured to the layer of fibrous material by the binding medium applied to the said fibrous layer.

9. A process for the manufacture of a molded product of the class specified, consisting in placing within a mold a layer of fibrous material to which is applied a binding medium capable of hardening, applying a layer of cork material to the fibrous material, and finally applying a stay member composed of long fibers to the layer of cork material at points to be stressed, the layer of cork material and stay member being secured to the fibrous material by the binding medium applied to the latter.

10. A process for the manufacture of a molded product of the class specified, consisting in placing within a mold a layer of fibrous material to which is applied a binding medium capable of hardening, arranging a layer of plates of cork on the layer of fibrous material, and finally applying reinforcing stays in recesses formed by the plates of cork material, the plates of cork material and stays being secured to the layer of fibrous material by the binding medium applied to said material.

11. A process for the manufacture of a molded product of the class specified, consisting in placing in a mold a layer of fibrous material and applying thereto a binding material capable of hardening, a cork core applied to the fibrous material, and associating reinforcing stays with and securing them to the cork core, the stays and cork core being secured to the fibrous material by the binding medium applied to said material.

ROBERT AUGUSTE LOUIS WEITZEL.